March 29, 1932.  G. L. BOSSARD  1,851,543
ELECTRIC MOTOR
Filed April 19, 1930
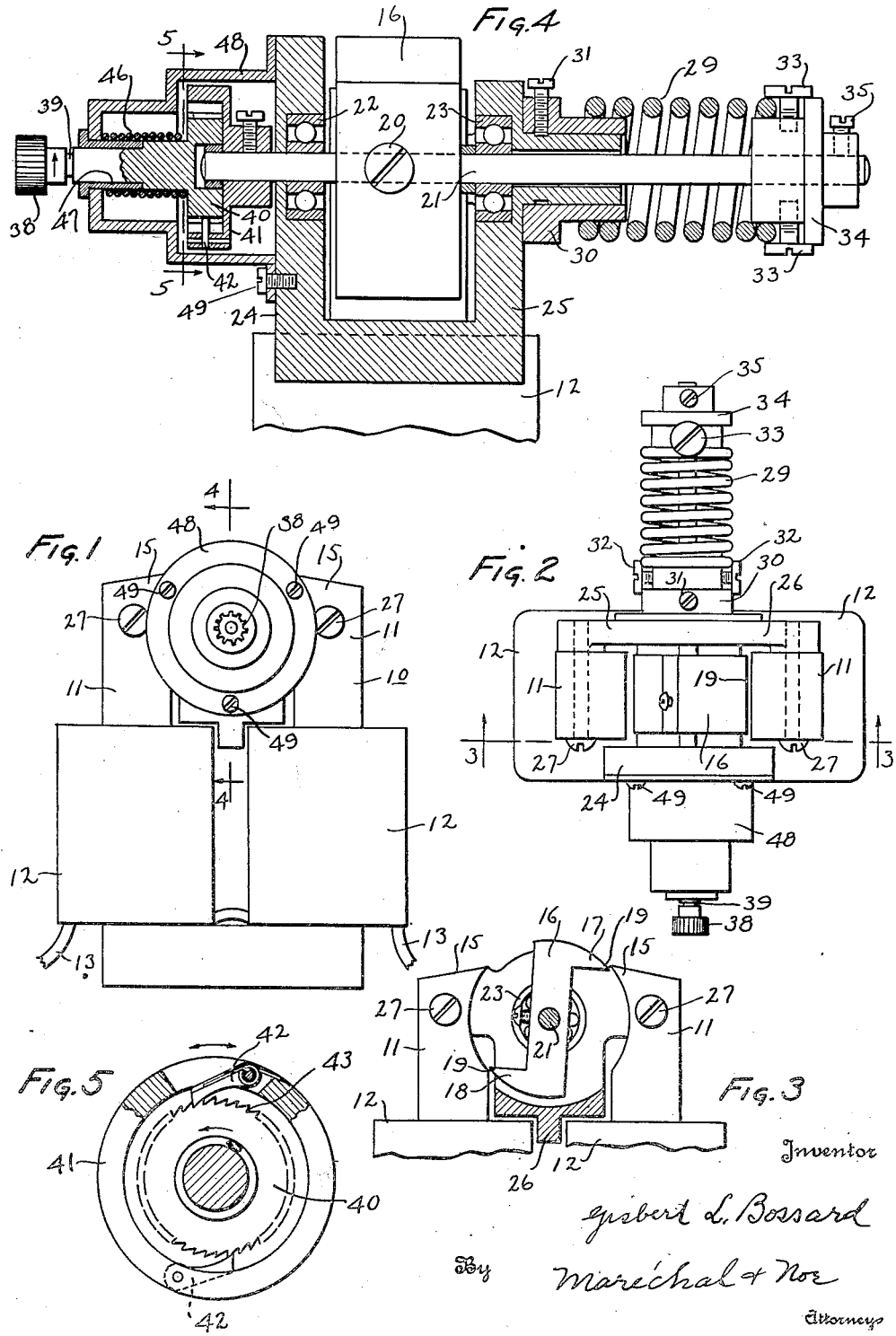

Patented Mar. 29, 1932

1,851,543

UNITED STATES PATENT OFFICE

GISBERT L. BOSSARD, OF DAYTON, OHIO, ASSIGNOR TO GENERAL KONTROLAR COMPANY, INC., OF DAYTON, OHIO, A CORPORATION OF OHIO

ELECTRIC MOTOR

Application filed April 19, 1930. Serial No. 445,673.

This invention relates to an electro-motive device, and more particularly to an electric motor having an armature or moving element of the oscillatory type.

One object of the invention is the provision of an electro-motive device having an electromagnet adapted to be energized by alternating current and an oscillatable armature assembly which has a mechanical period of oscillation substantially the same as the period of oscillation imparted to it electromagnetically.

Another object of the invention is the provision of a self-starting synchronous oscillatory motor of simple construction, having few moving parts and of great electrical simplicity.

Other objects and advantages of the invention will be apparent from the following description, the appended claims and the accompanying drawings, in which:

Fig. 1 is an end elevation of an electric motor embodying the present invention;

Fig. 2 is a top view thereof;

Fig. 3 is a section on the line 3—3 of Fig. 2;

Fig. 4 is a section on the line 4—4 of Fig. 1; and

Fig. 5 is a section on the line 5—5 of Fig. 4.

Referring by reference numerals to the drawings, in which one preferred embodiment of the invention is disclosed, 10 designates generally an electromagnet having a laminated or soft iron core piece 11 provided with a coil or coils 12 which are adapted to be connected by terminal wires 13 to a suitable source of alternating current. Between the pole pieces 15 of the core 11 is an oscillatably mounted armature 16. This armature is preferably constructed of the "Z" type, having opposite sides 17 and 18 each of which is projected towards the pole piece in the form of an extension or lip 19, the outer sides of the armature being circularly formed concentric with the circular formation of the pole pieces 15, so that the armature can be moved between the pole faces without impact engagement therewith, when the electromagnet is energized. When the coils 12 are energized by alternating current the lips or extensions 19 of the armature are pulled toward the pole pieces 15, and the armature will tend to rotate clockwise as shown in Fig. 3 from its normal position of rest as indicated in this figure. The armature 16 is preferably constructed of laminated sheets of soft iron connected tightly together and secured by a screw 20 or the like to the supporting shaft 21.

The armature shaft 21 is rotatably mounted for oscillatory movement in the ball or roller antifriction bearings 22 and 23, the races of which are suitably fixed in the side walls 24 and 25 of the fixed support 26 which is preferably in the form of a single integral or unitary die casting, secured by the attaching screws 27 to the ends of the pole pieces 11. At one end of the armature shaft 21 is a helical spring 29, one end of which is fixed to a collar 30 which is secured by set screw 31 to the side wall 25 of the fixed support. A simple means for securing the end of the spring to the collar 30, as indicated in Fig. 2, is a pair of screws 32 which hold the innermost turn of the spring in place on the collar 30 in an adjustable manner. The other end of the spring 29 is secured in a similar manner by screws 33 to a collar 34 which is fixed by set screw 35 to the end of the armature shaft 21.

The spring 29 is so fastened to the fixed support and to the armature shaft as to normally hold the lip extensions 18 in a normal position as shown in Fig. 3 from which they can be attracted by the electromagnetic pull of the magnet 10 when the latter is energized. Such a pull on the armature would move the armature a few degrees of angular movement in a clockwise direction, see Fig. 3, and this would wind up the spring, so that when the current value instantaneously falls to zero in the coil 12 of the magnet, which would occur twice during each alternating current cycle, the spring 29 can move the armature in a counterclockwise direction and thus pull the lip extension 18 away from its oscillated position adjacent a pole face 15. The natural period of the spring and armature assembly as arranged with respect to the pole pieces is about the same as the alternation period of the alternating current supplied to the electromagnet. Thus if the electromagnet is energized by 60 cycle current there would be 120 torque pulls per second exerted on the armature, and the latter would tend to oscillate back and forth at the rate of 120 oscillations per second. The period of the spring would be such as to cause the armature to tend to oscillate at this same frequency or period, and with such an arrangement there is a storage of energy and its subsequent release many times a second so that the maximum of efficiency is obtained. The spring force can be represented by a sine wave and as the electrical torque is also a sine wave in synchronism but opposed thereto, it is evident that very little electrical power will be consumed in the device to maintain its operation.

It has been found that the natural mechanical period of the spring need not exactly correspond with the electrical period of the armature, but if these two periods are about equal, the armature will be oscillated in a definitely synchronous manner. The constructional shape of the armature itself must also be taken into account in providing for an armature and spring assembly whose natural mechanical period is substantially the same as the electrical period induced electromagnetically.

The motion imparted to the armature shaft 21, being of an oscillatory character, is preferably transmitted in a step by step manner to a driven member such as the gear 38 shown in the form of a drive pinion adapted to be connected to any device to be operated. This pinion 38 is pinned or suitably fastened to a shaft 39 which is fixed to a flanged portion 40. The flanged portion 40 is adjacent a drive flange 41 suitably fixed to the armature shaft 21, and between the two parts 40 and 41 is a suitable ratchet drive connection as shown in Fig. 5. As therein indicated, the flange portion 41, forming the driver, is provided with pivoted pawls 42 which are adapted to engage with the ratchet teeth 43 provided on the circumferential portion of the flange 40, so that for each counterclockwise movement of the driving flange 41, see Fig. 5, the pawls will operate to create a single forward step of angular travel of the drive pinion 38. This drive pinion and the flange part 40 are prevented from moving in a direction reverse from the forward driving direction by suitable holding means such as the helical spring 46, which is snugly wound on the fixed sleeve 47, and on the rotatable hub portion of the flanged part 40, these two parts being of the same external diameter so that any relative rotational movement between these two parts in a direction reverse to forward drive would tend to wind the spring tightly thereon and thus instantly hold the driven flange part 40 from such reverse movement although permitting continued forward drive movements. Such forward drive movements would merely tend to unwind the spring from its snug engagement on the peripheral surfaces by which it is supported. With a ratchet device of this kind there is a measured regular forward step of the drive gear 38 for each cycle of movement of the armature, which in moving at a definite synchronous speed causes a definite forward drive for any particular time interval. Where the exact travel of the gear 38 is immaterial for any time interval obviously a friction one way drive or ball clutch may be used in place of the pawls and ratchet.

A casing 48 is suitably connected to the fixed support 25 as by means of the screws 49, and supports the fixed sleeve 47 and encloses the operating power transmitting parts of the mechanism. The entire operating device can be covered by means of a detachable casing, not shown, leaving only the gear 38 projecting so that it may be readily engaged with any device to be operated.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An electro-motive device of the class described comprising an alternating current electromagnet having an oscillatably pivoted armature supported for movement about an axis between the poles of the electromagnet and movable without impact engagement with the said poles, and a spring connected to said armature so as to operate against the pull of the electromagnet on the armature, the oscillatory period of the spring being about the same as the alternation period of the alternating current supplied to the electromagnet.

2. An electro-motive device of the class described comprising an alternating current electromagnet having an oscillatably pivoted armature operatively associated with the poles of the electromagnet without impact engagement therewith, a spring connected to said armature so as to operate against the pull of the electromagnet on the armature, the oscillatory period of the spring being about the same as the alternation period of the alternating current supplied to the electromagnet, and power transmitting means connected to said armature for producing a continuous step by step rotary movement from the oscillatory movement of the armature.

3. An electro-motive device of the class described comprising an electromagnet adapted to be energized continuously by alternating current, and having an oscillatable armature pivotally supported for movement about an axis between the poles of the electromagnet and movable without impact engagement with said poles, said armature having a soft iron body portion provided with opposite outwardly extending projecting portions on the opposite ends of the body portion, and a spring connected to said armature and to a fixed point and operating against the pull of the electromagnet on the armature, the oscilatory period of the spring being about the same as the alternation period of the alternating current supplied to the electromagnet.

4. An electro-motive device of the class described, comprising an alternating current electromagnet adapted to be continuously energized and having an oscillatable armature supported for movement about an axis between the poles of the electromagnet and movable without impact engagement with said poles, and a tuned mechanical means having an oscillatory period substantially the same as the alternation period of the alternating current supplied to the electromagnet said means being connected with the armature so as to normally tend to hold the armature away from an attracted position, and acting against the pull of the electromagnet when the armature is moved to an attracted position.

5. An electro-motive device of the class described comprising an alternating current electromagnet having an oscillatably mounted armature supported for movement about an axis between the poles of the electromagnet and movable without impact engagement with said poles, a fixed support connected to said electromagnet and having roller bearings for rotatably supporting said armature, and a helical spring connected at one end to said support and at the other end to said armature, said armature and spring together having a natural mechanical period substantially the same as the period imparted electromagnetically to said armature.

6. An electro-motive device of the class described, comprising an alternating current electromagnet adapted to be continuously energized and having an oscillatable armature movable between the poles of the magnet without impact engagement therewith, a spring connected to said armature and operating against the pull of the electromagnet on the armature from a normal position thereof, said armature and spring having a natural mechanical period of oscillation substantially equal to the period imparted thereto electromagnetically, a drive member, means preventing reverse movement of said member, and power transmitting means between said armature and said member for causing a forward rotative step of said member for each cycle of operations of the armature.

7. An electro-motive device of the class described, comprising an alternating current electromagnet adapted to be continuously energized and having an oscillatable armature movable between the poles of the magnet without impact engagement therewith, a spring connected to said armature and operating against the pull of the electromagnet on the armature from a normal position thereof, said armature and spring having a natural mechanical period of oscillation substantially equal to the period imparted thereto electromagnetically, a driven member, means preventing reverse movement of said member, and pawl and ratchet means between said armature and said member for causing a forward rotative step of said member of predetermined constant angular movement for each cycle of operations of the armature.

In testimony whereof I hereto affix my signature.

GISBERT L. BOSSARD.